United States Patent
Seo et al.

(10) Patent No.: US 8,842,066 B2
(45) Date of Patent: Sep. 23, 2014

(54) METHOD FOR DRIVING THREE-DIMENSIONAL (3D) DISPLAY AND 3D DISPLAY APPARATUS USING THE SAME

(75) Inventors: Min-suk Seo, Seoul (KR); Jong-hoon Jung, Suwon-si (KR); Sang-moo Park, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 401 days.

(21) Appl. No.: 12/964,901

(22) Filed: Dec. 10, 2010

(65) Prior Publication Data

US 2011/0148943 A1 Jun. 23, 2011

(30) Foreign Application Priority Data

Dec. 22, 2009 (KR) .................. 10-2009-0129031

(51) Int. Cl.
*G09G 3/36* (2006.01)
*H04N 13/04* (2006.01)

(52) U.S. Cl.
CPC ...... *H04N 13/0438* (2013.01); *H04N 2213/007* (2013.01); *H04N 13/0497* (2013.01); *H04N 13/04* (2013.01)
USPC ........................................... 345/102; 345/98

(58) Field of Classification Search
USPC ............. 345/6, 87, 98–100, 102, 204; 348/51
See application file for complete search history.

(56) References Cited

U.S. PATENT DOCUMENTS

2007/0242008 A1    10/2007   Cummings
2011/0050860 A1*   3/2011    Watson .......................... 348/51

FOREIGN PATENT DOCUMENTS

WO    2007/126904 A2    11/2007

OTHER PUBLICATIONS

Communication dated Nov. 7, 2012, issued by the European Patent Office in counterpart European Application No. 10194956.8.

* cited by examiner

*Primary Examiner* — Regina Liang
(74) *Attorney, Agent, or Firm* — Sughrue Mion, PLLC

(57) ABSTRACT

A method for driving a three dimensional (3D) display and a 3D display apparatus using the same are provided. The 3D display apparatus includes a storage unit which stores a received image; and a controller which compares a previous frame of the received image with a current frame of the received image, and determines whether or not to input an image of the current frame to a liquid crystal panel based on whether the previous frame is identical to the current frame. Therefore, a method for driving a 3D display which does not cause characteristics of a liquid crystal to be deteriorated and a 3D display apparatus using the same are provided.

14 Claims, 7 Drawing Sheets

METHOD FOR DRIVING THREE-DIMENSIONAL (3D) DISPLAY AND 3D DISPLAY APPARATUS USING THE SAME

CROSS-REFERENCE TO RELATED APPLICATIONS

This application claims priority under 35 U.S.C. §119 from Korean Patent Application No. 10-2009-0129031, filed on Dec. 22, 2009, in the Korean Intellectual Property Office, the disclosure of which is incorporated herein by reference in its entirety.

BACKGROUND

1. Field

Apparatuses and methods consistent with the exemplary embodiments relate to a three-dimensional (3D) display, and more particularly, to a method for driving a 3D display which employs a liquid crystal display (LCD) to which an overdrive method is applied and a 3D display apparatus using the same.

2. Description of the Related Art

In recent years, as the trend of developing large-sized televisions continues, a user can view images through a larger screen. The trend towards larger televisions has been accelerated by a thin film transistor liquid crystal display (TFT-LCD) and a plasma display panel (PDP), two leading products in flat panel display.

An LCD is a display apparatus which obtains an image signal by applying an electric field to the liquid crystal with anisotropy dielectric between two panels, and charging the alignment of the liquid crystal, which is made possible by adjusting the strength of the electric field and thus, the amount of light passing through the panels. An LCD apparatus consumes less power and has lighter weight compared to a PDP, but it has a longer response time since the arrangement of liquid crystal changes.

To resolve the above problem, an overdrive method is usually used. When overdrive voltage is applied within the frame transition period, a response time is faster within the frame transition period, thereby increasing overall response time.

A 3D image provides stereoscopic effect using binocular disparity by outputting the left eye image and the right eye image alternately, which is a different way of outputting images from that of a 2D image. Therefore, it is difficult to apply an overdrive of the related art to the 3D display apparatus. Moreover, even though the overdrive is applied, the left eye image may overlap partly with the right eye image, or characteristics of a liquid crystal may not be realized appropriately, for instance, because of unstable luminance.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

The exemplary embodiments provide a method for driving a 3D display which does not deteriorate characteristics of a liquid crystal when outputting a 3D image and a 3D display apparatus using the same.

The exemplary embodiments also provide a method for driving a 3D display without a cross-talk phenomenon which causes consecutive images to overlap with one another when an LCD outputs a 3D image and a 3D display apparatus using the same.

According to an exemplary embodiment, there is provided a method for driving a display, including comparing a previous frame of a received image with a current frame of the received image; and determining whether or not to input an image of the current frame to a liquid crystal panel based on whether the previous frame is identical to the current frame.

The method may further include if the previous frame is different from the current frame, inputting the image of the current frame to the liquid crystal panel, and if the previous frame is identical to the current frame, not inputting the image of the current frame to the liquid crystal panel.

The method may further include determining whether or not to turn on a backlight unit based on whether the previous frame is identical to the current frame.

The determining whether or not to turn on the backlight unit, if the previous frame is different from the current frame, may turn off the backlight unit so that the image input to the liquid crystal panel is not displayed, and if the previous frame is identical to the current frame, turn on the backlight unit so that the image input to the liquid crystal panel is displayed.

The image may be a three-dimensional (3D) image in which the same two left eye frames and the same two right eye frames alternate with each other.

According to another exemplary embodiment, there is provided a display apparatus, including a storage unit which stores a received image; and a controller which compares a previous frame of the received image with a current frame of the received image, and determines whether or not to input an image of the current frame to a liquid crystal panel based on whether the previous frame is identical to the current frame.

The controller, if the previous frame is different from the current frame, may input the image of the current frame to the liquid crystal panel, and if the previous frame is identical to the current frame, does not input the image of the current frames to the liquid crystal panel.

The controller may determine whether or not to turn on a backlight unit based on whether the previous frame is identical to the current frame.

The controller, if the previous frame is different from the current frame, may turn off the backlight unit so that the image input to the liquid crystal panel is not displayed, and if the previous frame is identical to the current frame, turn on the backlight unit so that the image input to the liquid crystal panel is displayed.

The image may be a three-dimensional (3D) image in which the same two left eye frames and the same two right eye frames alternate with each other.

The received image may be a 3D image.

The display apparatus may be a liquid crystal display (LCD).

BRIEF DESCRIPTION OF THE DRAWINGS

The above and/or other aspects of the exemplary embodiments will be more apparent by describing certain exemplary embodiments with reference to the accompanying drawings, in which.

DETAILED DESCRIPTION OF THE EXEMPLARY EMBODIMENTS

Certain exemplary embodiments will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

Figure 1:
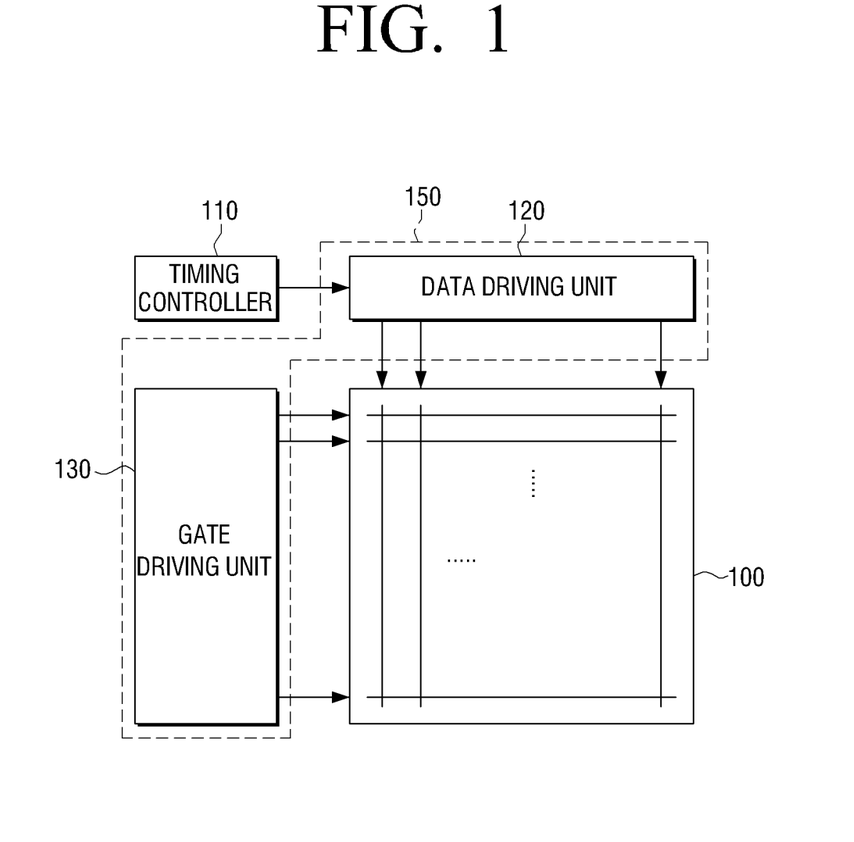
FIG. 1 is a view illustrating a display apparatus according to an exemplary embodiment.

FIG. 1 is a view illustrating a display apparatus according to an exemplary embodiment. The display apparatus according to the exemplary embodiment outputs a three-dimensional (3D) image which includes two left eye images and two right eye images alternately in the order of a left eye frame (hereinbelow, referred to as L-frame), an L-frame, a right eye frame (hereinbelow, referred to as R-frame), and an R-frame.

Referring to FIG. 1, the display apparatus comprises a panel unit 100, a timing controller 110, and a driving unit 150.

The panel unit 100 comprises a plurality of gate lines, a plurality of data lines, and a plurality of pixels formed on areas on which the gate lines are arranged across the data lines.

The data line receives data voltage, which is converted from grayscale data, from a data driving unit 120, and applies the data voltage to pixels. The data driving unit 120 will be explained later.

The gate line receives gate-on voltage from a gate driving unit 130, and applies the gate-on voltage to pixels. The gate driving unit 130 will be explained later.

A pixel is formed on an area on which a gate line for applying gate-on voltage and a data line for applying data voltage are arranged to cross each other.

Figure 2:
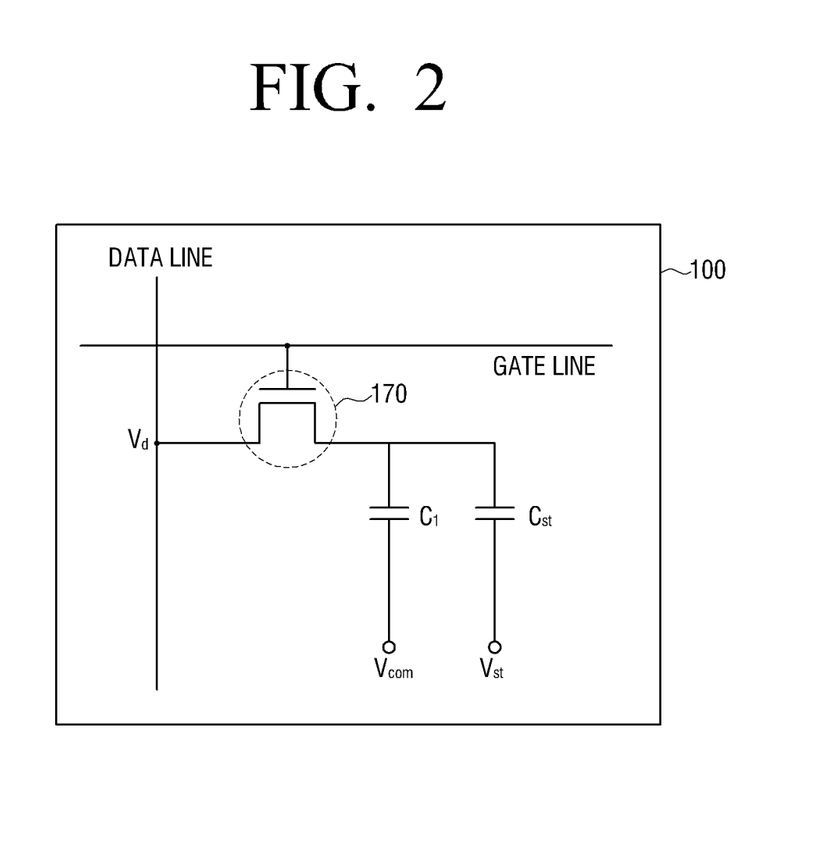
FIG. 2 is a view illustrating the structure of a pixel of a panel unit according to an exemplary embodiment.

The pixel will be explained in detail with reference to FIG. 2. FIG. 2 shows the structure of a pixel according to an exemplary embodiment.

A pixel includes a thin-film transistor 170, a liquid crystal capacitor C1, and a storage capacitor Cst. The thin-film transistor 170 has a source electrode connected to a data line and a gate electrode connected to a gate line. The liquid crystal capacitor C1 and the storage capacitor Cst are connected to a drain electrode of the thin-film transistor 170.

If gate-on voltage is applied to a gate line, and thus the thin-film transistor 170 is turned on, the data voltage Vd applied to a data line is applied to an electrode of each pixel through the thin-film transistor 170. Then, an electric field corresponding to a difference between the pixel voltage and the common voltage Vcpm is applied to a liquid crystal, and light penetrates the panel unit at the transmittance corresponding to the strength of the electric field.

Referring again to FIG. 1, the timing controller 110 transmits a current frame to the data driving unit 120 to drive the panel unit 100.

The timing controller 110 receives an image signal from an external source and performs data processing on the image signal. To be specific, the timing controller 110 receives red, green, blue (RGB) data, an enable signal for indicating the time point of a frame, a synchronization signal, and a clock signal, and generates a controlling signal such as a vertical sync timing (STV) signal, a clock pulse vertical (CPV) signal, or the like. Herein, the STV signal refers to a vertical sync timing signal indicating the start of outputting a gate-on voltage, and the CPV signal refers to a signal for controlling the timing of the output of gate-on voltage.

The driving unit 150 comprises the data driving unit 120 and a gate driving unit 130. The data driving unit 120 converts data of a frame received from the timing controller 110 into voltage, applies the voltage to each of the data lines. The gate driving unit 130 applies gate-on voltage to gate lines sequentially, and turns on the thin-film transistor 170 where the gate electrode is connected to the gate lines to which the gate-on voltage is applied.

Herein, if an input image is a 3D-image having two L-frames and two R-frames in the order of L-frame, L-frame, R-frame, and R-frame, an STV signal is generated to input the first L-frame to the panel unit 100. However, since an STV signal is not generated for the second L-frame, the first L-frame is charged in the storage capacitor Cst as it is.

Likewise, an STV signal is generated to input the first R-frame to the panel unit 100, but an STV signal is not generated for the second R-frame. Therefore, the first R-frame is charged in the storage capacitor Cst as it is.

In other words, if the current frame is not identical to the previous frame, an STV signal is generated and thus the current frame is input to the panel unit 100, and if the current frame is identical to the previous frame, the previous frame is continuously charged in the storage capacitor Cst without generating an STV signal.

A backlight unit (BLU) (not shown) which emits backlight to a rear surface of the panel unit 100 operates in conjunction with the panel unit 100. When a frame is input to the panel unit 100, the backlight unit is turned off and thus does not emit backlight.

However, if a frame is not input to the panel unit 100, the backlight unit emits backlight while being turned on, and thus the previous frame which has been charged is displayed.

When the first R-frame needs to be output after the second L-frame is output, a user may not recognize an output of the first R-frame since the backlight unit is turned off when the first R-frame is input to the panel unit 100. However, at the timing when the second R-frame is output, an STV signal is not generated and the backlight unit is turned on. Then, the R-frame which has been charged already receives backlight and is thus displayed. Therefore, the exemplary embodiment may prevent such problems as residual images appearing when an L-frame is changed to an R-frame or vice versa.

Figure 3:
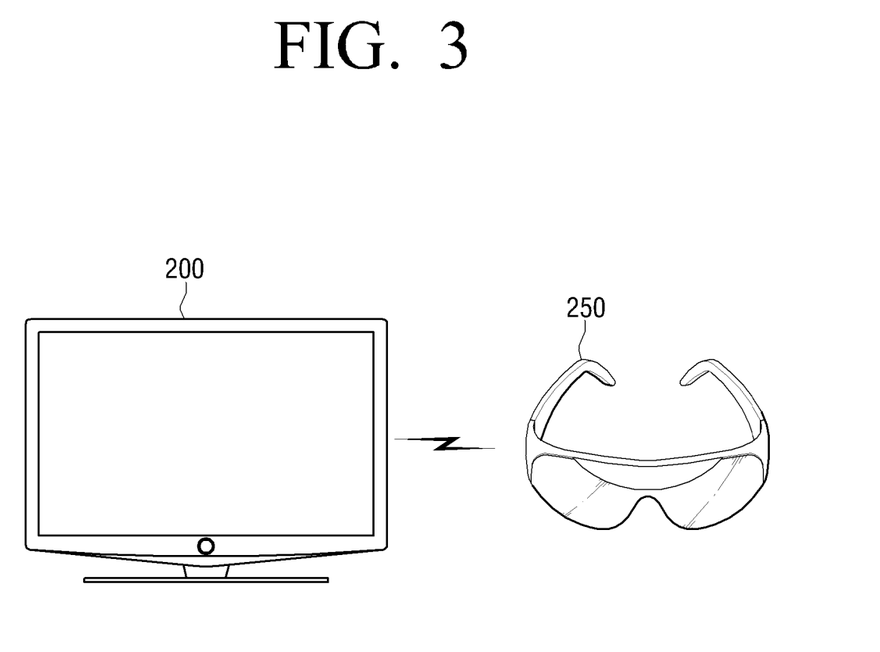
FIG. 3 is a view illustrating a 3D image system applied to an exemplary embodiment.

FIG. 3 is a view illustrating a 3D image system applied to an exemplary embodiment. The 3D image system comprises a 3D display 200 and 3D glasses 250 which are capable of communicating with each other.

The 3D display 200 alternately displays an L-frame and an R-frame, and a user may view a 3D image by viewing the L-frame and the R-frame displayed on the 3D display 200 in an alternate order using a left eye and a right eye wearing the 3D glasses 250.

Since the 3D display 200 is synchronized with the 3D glasses 250, 3D images are displayed in such a manner that if the 3D display 200 outputs an L-frame, a left eye shutter of the 3D glasses 250 is opened and a right eye shutter is closed, and if the 3D display 200 outputs an R-frame, a left eye shutter is closed, and a right eye shutter is opened.

An image input to the 3D display 200 may be a 3D image which is composed of two L-frames and two R-frames being output alternately in the order of L-frame, L-frame, R-frame, and R-frame. If the current frame is not identical to the previous frame, an STV signal is generated and thus the current frame is input to the panel unit 100. On the other hand, if the current frame is identical to the previous frame, an STV signal is not generated, and the previous frame is continuously charged.

The backlight unit (not shown) which emits backlight to a rear surface of the panel unit 100 operates in conjunction with the panel unit 100. If a frame is input to the panel unit 100, the backlight unit is turned off and thus does not emit backlight.

However, if a frame is not input to the panel unit 100, the backlight unit is turned on and thus emits backlight, thereby displaying the previous frame which has been charged.

When the first R-frame needs to be output after the second L-frame is output, a user may not recognize an output of the first R-frame since the backlight unit is turned off when the first R-frame is input to the panel unit 100. However, at the timing when the second R-frame is output, an STV signal is not generated and the backlight unit is turned on. Then, the R-frame which has been charged already receives backlight and is thus displayed.

As described above, the 3D display 200 and the 3D glasses 250 are synchronized with each other. Therefore, a left eye shutter is opened and a right eye shutter is closed while an L-frame is output, and a left eye shutter is closed and a right eye shutter is opened while an R-frame is output.

Figure 4:
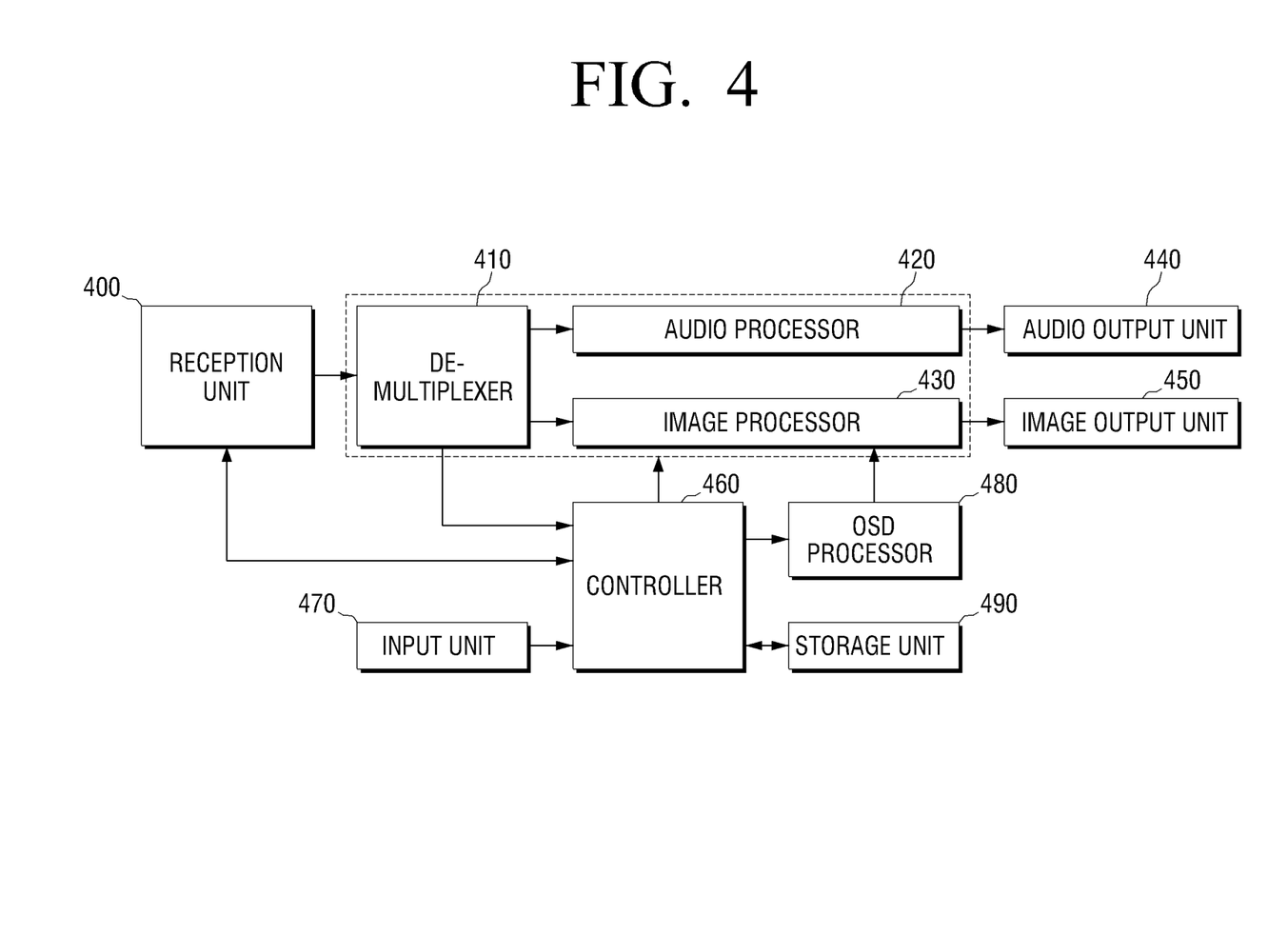
FIG. 4 is a block diagram illustrating a display apparatus according to an exemplary embodiment.

FIG. 4 is a block diagram illustrating a display apparatus according to an exemplary embodiment.

Referring to FIG. 4, a 3D image display apparatus comprises a reception unit 400, a de-multiplexer 410, an audio processor 420, an image processor 430, an audio output unit 440, an image output unit 450, a controller 460, an input unit 470, an on-screen display (OSD) processor 480, and a storage unit 490.

The reception unit 400 receives a 3D image in a wired or wireless manner, and provides the de-multiplexer 410 with the received 3D image. To be more specific, the reception unit 400 wirelessly receives a 3D image from a 3D image provider or wiredly receives a 3D image from a digital versatile disc (DVD) or settop box, and provides the de-multiplexer 410 with the received 3D image.

The de-multiplexer 410 separates a broadcast signal output from the reception unit 400 into an image signal and an audio signal, and outputs the separated signals to the audio processor 420 and the image processor 430, respectively.

The audio processor 420 decodes an audio signal separated by the de-multiplexer 410, converts the decoded signal into a format of an audio signal which can be output through the audio output unit 440, and provides the audio output unit 440 with the converted audio signal. The image processor 430 decrypts an image signal separated by the de-multiplexer 410, converts the separated image signal into a format of an image signal which can be output through the image output unit 450, and provides the image output unit 450 with the converted image signal.

The audio output unit 440 outputs an audio signal input from the audio processor 420, and the image output unit 450 outputs an image signal input from the image processor 430. In particular, the image output unit 450 provides a user with a 3D image by outputting a left eye image and a right eye image of the decrypted image alternately.

The input unit 470 generates an input command in response to a manipulation of a user, and provides the controller 460 with the generated input command. The signal input to the input unit 470 may be a signal which a user inputs using a keypad that is integrated with a display apparatus or a signal which is input through a remote controller that is separated from a display apparatus.

The OSD processor 480 causes an OSD menu to be displayed so that a user may input a signal through an OSD menu.

The controller 460 controls the reception unit 400 to receive a 3D image, and controls the de-multiplexer 410, the audio processor 420, and the image processor 430 to separate and decrypt the received 3D image. In addition, the controller 460 controls the reception unit 400, the audio processor 420, the image processor 430, and the OSD processor 480 in response to a signal input by a user using the input unit 470.

In particular, the controller 460 controls the timing controller 110, the driving unit 150, and the panel unit 100 shown in FIG. 1 to generate a controlling signal and then to determine whether or not to input frames of a 3D image to the panel unit 100, or controls the backlight unit (not shown) to determine whether or not to emit backlight.

The storage unit 490 temporarily stores a received 3D image, and the controller 460 compares the previous frame and the current frame with reference to the 3D image stored in the storage unit 490 so as to determine whether the previous frame is identical to the current frame or not. In addition, the storage unit 490 may be utilized as a space needed when the audio processor 420 processes an audio signal or when the image processor 430 processes an image signal.

Hereinbelow, a method for driving a display according to an exemplary embodiment will be explained with reference to FIG. 5.

Figure 5:
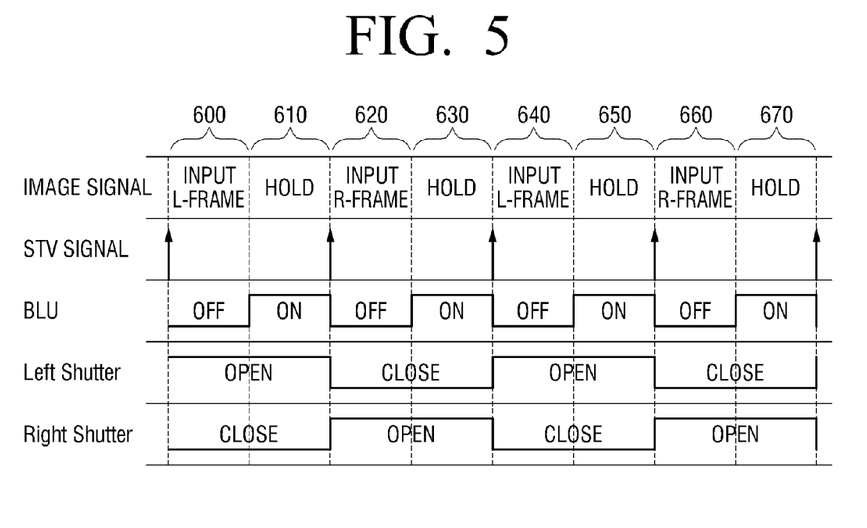
FIG. 5 is a view provided to explain a method for driving a display according to an exemplary embodiment.

As shown in FIG. 5, a received 3D image is composed of L-frame, L-frame, R-frame, R-frame, L-frame, L-frame, R-frame, R-frame, L-frame, . . . . That is, two L-frames 600, 610, two R-frames 620, 630, two L-frames 640, 650, and two R-frames 660, 670 are input alternately, and thus a 3D image is displayed.

In this exemplary embodiment, the first L-frame 600 receives an STV signal which is then input to a liquid crystal panel, but the first L-frame is not displayed since the backlight unit is turned off. However, in the second L-frame 610, neither is an STV signal generated nor is the second L-frame input to the liquid crystal panel. Instead, the image of the first L-frame 600 which has already been charged is displayed by receiving backlight from the backlight unit.

As described above, a left eye shutter of the 3D glasses 250 is opened and a right eye shutter of the 3D glasses 250 is closed while two L-frames operate. In doing so, a user may recognize a left eye image through a left eye. To be more precise, a user recognizes the L-frame which has been charged.

Then, an STV signal for controlling an output of the first R-frame is generated, and an image corresponding to the R-frame is input to the liquid crystal panel. However, the image is not displayed on the display since the backlight unit is turned off. Since an STV signal is not generated at the timing when the second R-frame is supposed to be input, the second R-frame is not input to the liquid crystal panel, and the liquid crystal panel receives backlight from the backlight unit to display the first R-frame while the first R-frame is being charged.

In this situation, the left eye shutter of the 3D glasses 250 is closed, and the right eye shutter of the 3D glasses 250 is opened. Therefore, a user recognizes an R-frame through a right eye.

An STV signal causes the first L-frame 640 to be input to the liquid crystal panel, but the backlight unit is turned off. The second L-frame 650 is not input, and instead the first L-frame which has been charged receives backlight from the backlight unit and thus is displayed. The first R-frame 660 is input to the liquid crystal panel by an STV signal, but the backlight unit is turned off. The second R-frame 670 is not input to the liquid crystal panel, and the first R-frame which has been charged receives backlight from the backlight unit and thus is displayed. The 3D glasses 250 are synchronized with the 3D display 200, and thus the left eye shutter is opened while the L-frame is displayed and the right eye shutter is opened while the R-frame is displayed.

According to the above described method for driving a display, at the timing when an L-frame is changed to an R-frame or vice versa, the backlight unit is turned off, and thus deterioration of characteristics of an LCD such as overlapping frames may be prevented.

In the second frames, neither is an STV signal generated nor are the second frames input to the liquid crystal panel. Instead, the image of the first frames which have already been charged is displayed on the liquid crystal panel by receiving backlight from the backlight unit. Therefore, if an overdrive method is applied to a display, an undershoot phenomenon which causes unstable luminance due to a potential difference may be prevented. The effect according to the exemplary embodiment will be explained below with reference to FIG. 6.

Figure 6:
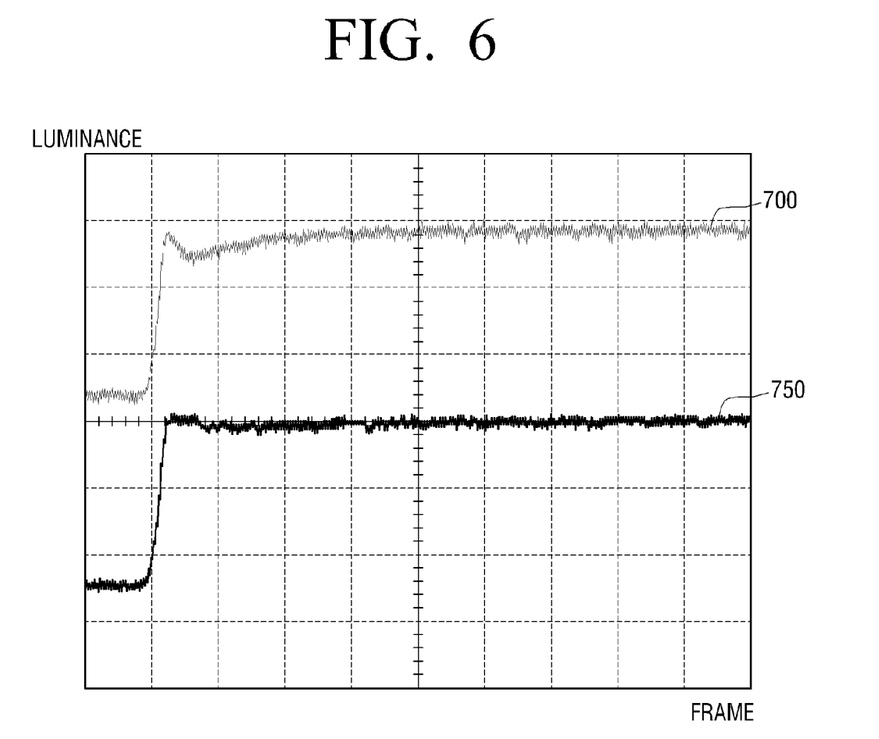
FIG. 6 shows an effect according to an exemplary embodiment.

FIG. 6 shows an improved effect of a display apparatus according to an exemplary embodiment over a display apparatus of a related art.

In the graph of FIG. 6, an upper line 700 shows luminance of a frame when an overdrive method of a related art is employed, and a lower line 750 shows luminance of a frame when a display apparatus according to an exemplary embodiment is employed.

The overdrive refers to a method for improving a response time. The overdrive method aims to achieve a target luminance value more rapidly by applying luminance higher than a target level, thereby displaying an image having a target luminance. To achieve target luminance, luminance values which should be overdriven may be pre-stored in a lookup table.

As shown in the upper line 700 of FIG. 6, if a 3D image is overdriven, the 3D image achieves target luminance rapidly. However, if the same 3D image is input later, an undershoot phenomenon in which the 3D image does not maintain the target luminance and the luminance is slightly decreased may occur. Such an undershoot phenomenon may occur when an L-frame to which an overdrive is applied as it is input to a liquid crystal panel by an STV signal is input again to the liquid crystal panel.

However, in the exemplary embodiment, the same L-frame or the same R-frame is not input to the liquid crystal panel again. Therefore, the undershoot phenomenon which makes luminance unstable after target luminance is achieved may not occur as shown in the lower line 750 of FIG. 6.

That is, the exemplary embodiment may maintain desired target luminance in a constant level even if an overdrive method is employed to improve a response time of an LCD.

Figure 7:
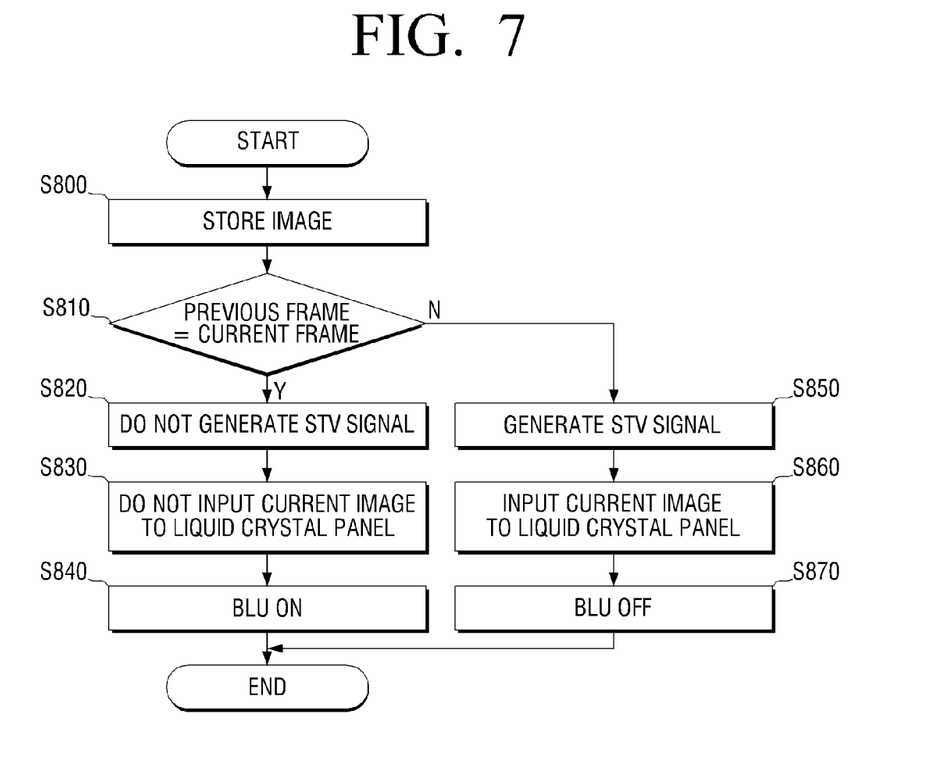
FIG. 7 is a flowchart provided to explain a method for driving a display according to an exemplary embodiment.

FIG. 7 is a flowchart provided to explain a method for driving a display according to an exemplary embodiment.

If the reception unit 400 receives a 3D image, the 3D image is stored in the storage unit 490 (S800). The controller 460 determines whether the current frame is identical to the previous frame or not with reference to the pre-stored data (S810).

If it is determined that the current frame is not identical to the previous frame (S810-N), an STV signal is generated (S850). The STV signal causes an image of the current frame to be input to a liquid crystal panel (S860). In this situation, the backlight unit is turned off and thus the input image is not displayed (S870).

On the other hand, if it is determined that the current frame is identical to the previous frame (S810-Y), an STV signal is not generated (S820). Therefore, the current frame is not input to a liquid crystal panel (S830), and the backlight unit is turned on (S840). In this situation, even if an image of the current frame is not input to the liquid crystal panel, there is a frame which has been charged already. Therefore, if the backlight unit is turned on, an image of the frame which has been charged is displayed.

The method for driving a 3D display and the 3D display apparatus using the same as described above may prevent characteristics of a liquid crystal from being deteriorated when a 3D image is output. In particular, a cross-talk phenomenon which occurs when a 3D image is continuously input may be prevented.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for driving a display, the method comprising:
comparing a first image frame included in a three-dimensional (3D) image with a consecutive second image frame included in the 3D image;
inputting the consecutive second image frame to a liquid crystal panel, when the first image frame and the second image frame are different from each other; and
turning on a backlight unit based on a comparison result, when the first image frame and the second image frame are the same to each other.

2. The method as claimed in claim 1, further comprising:
inputting the consecutive second image frame to the liquid crystal panel if the first image frame is different from the consecutive second image frame, and not inputting the consecutive second image frame to the liquid crystal panel if the first image frame is identical to the consecutive second image frame of the received image.

3. The method as claimed in claim 1, wherein if the first image frame is different from the consecutive second image frame, the backlight unit is turned off so that an image input to the liquid crystal panel is not displayed, and if the first image frame is identical to the consecutive second image frame, the backlight unit is turned on so that the image input to the liquid crystal panel is displayed.

4. The method as claimed in claim 1, wherein a received image comprising the first image frame and the consecutive second image frame is a three-dimensional (3D) image in which a same two left eye frames and a same two right eye frames alternate with each other.

5. A display apparatus, comprising:
a storage unit which stores a received three-dimensional (3D) image; and a controller which compares a first image frame of the received 3D image with a consecutive second image frame included in the received 3D image, inputs the consecutive second image frame to a liquid crystal panel when the first image frame and the second image frame are different from each other, and turns on a backlight unit based on the comparison result when the first image frame and the second image frame are the same to each other.

6. The display apparatus as claimed in claim 5, wherein the controller inputs the consecutive second image frame of the received image to the liquid crystal panel if the first image frame of the received image is different from the consecutive second image frame of the received image, and does not input the consecutive second image frame of the received image to the liquid crystal panel if the first image frame of the received image is identical to the consecutive second image frame of the received image.

7. The display apparatus as claimed in claim 5, wherein the controller, if the first image frame of the received image is different from the consecutive second image frame of the received image, turns off the backlight unit so that the image input to the liquid crystal panel is not displayed, and if the first image frame of the received image is identical to the consecutive second image frame of the received image, turns on the backlight unit so that the image input to the liquid crystal panel is displayed.

8. The display apparatus as claimed in claim 5, wherein the received image is a three-dimensional (3D) image in which a same two left eye frames and a same two right eye frames alternate with each other.

9. The display apparatus as claimed in claim 5, wherein the received image is a 3D image.

10. The display apparatus as claimed in claim 5, wherein the display apparatus is a liquid crystal display (LCD).

11. A method for driving a display, the method comprising:
comparing a first image frame included in a three-dimensional (3D) image with a consecutive second image frame included in the 3D image;
determining if the first image frame is identical to the consecutive second image frame, and
turning on a backlight unit based on a result of the determining that the first image frame and the second image frame are the same to each other.

12. The method of claim 11, further comprising turning off the backlight unit if the first image frame is different from the consecutive second image frame.

13. The method of claim 12, further comprising inputting the image of the consecutive second image frame to a liquid crystal panel if the first image frame is different from the consecutive second image frame e, and not inputting the image of the consecutive second image frame if the first image frame is identical to the consecutive second image frame.

14. The method of claim 11, wherein a received image comprising the first image frame and the consecutive second image frame is a three-dimensional (3D) image in which a same two left eye frames and a same two right eye frames alternate with each other.

* * * * *